United States Patent
Flanagan et al.

(10) Patent No.: US 12,112,312 B2
(45) Date of Patent: Oct. 8, 2024

(54) SYSTEM AND METHOD FOR RAPID ACTIVATION AND PROVISIONING OF AN ELECTRONIC PAYMENT DEVICE

(71) Applicant: Visa International Service Association, San Francisco, CA (US)

(72) Inventors: Patrick Ryan Flanagan, San Ramon, CA (US); Christopher Carlisle Weber, San Francisco, CA (US)

(73) Assignee: Visa International Service Association, San Francisco, CA (US)

( * ) Notice: Subject to any disclaimer, the term of this patent is extended or adjusted under 35 U.S.C. 154(b) by 86 days.

(21) Appl. No.: 17/885,827

(22) Filed: Aug. 11, 2022

(65) Prior Publication Data
US 2022/0383291 A1 Dec. 1, 2022

Related U.S. Application Data

(63) Continuation of application No. 16/962,569, filed as application No. PCT/US2019/013973 on Jan. 17, 2019, now Pat. No. 11,443,295.
(Continued)

(51) Int. Cl.
*G06Q 20/32* (2012.01)
*G06Q 20/34* (2012.01)
*G06Q 20/40* (2012.01)

(52) U.S. Cl.
CPC ..... *G06Q 20/3226* (2013.01); *G06Q 20/3223* (2013.01); *G06Q 20/3263* (2020.05); *G06Q 20/3265* (2020.05); *G06Q 20/354* (2013.01)

(58) Field of Classification Search
CPC .......... G06Q 20/3226; G06Q 20/3223; G06Q 20/3263; G06Q 20/3265; G06Q 20/354; G06Q 20/40
(Continued)

(56) References Cited

U.S. PATENT DOCUMENTS 5,572,643 A 11/1996 Judson
6,488,206 B1 12/2002 Flaig et al.
(Continued)

FOREIGN PATENT DOCUMENTS

EP 1633100 A1 3/2006

OTHER PUBLICATIONS

Simpson, "Westpac is Now on Board With Samsung Pay", GIZMODO Australia, Apr. 11, 2017, 3 pages, https://www.gizmodo.com.au/2017/04/westpac-is-now-on-board-with-samsung-pay/.

*Primary Examiner* — Clifford B Madamba
(74) *Attorney, Agent, or Firm* — The Webb Law Firm

(57) ABSTRACT

Provided herein are systems and methods for rapid activation of electronic payment devices with a mobile device. The method includes generating, with at least one processor, activation data corresponding to a non-activated electronic payment device issued to a user, storing, on an activation element associated with the electronic payment device, a unique identifier corresponding to the electronic payment device, receiving, with at least one processor, an activation request from a mobile device in response to the user scanning the activation element with the mobile device, the activation request comprising identification data associated with the user and the unique identifier, determining, with at least one processor, that the activation data matches the identification data, and, in response to determining that the activation data matches the identification data, activating the electronic payment device.

20 Claims, 4 Drawing Sheets

Related U.S. Application Data

(60) Provisional application No. 62/618,314, filed on Jan. 17, 2018.

(58) Field of Classification Search
USPC .......................................................... 705/41
See application file for complete search history.

(56) References Cited

U.S. PATENT DOCUMENTS

| | | |
|---|---|---|
| 6,952,645 B1 | 10/2005 | Jones |
| 7,445,147 B2 | 11/2008 | Hein |
| 7,567,934 B2 | 7/2009 | Flitcroft et al. |
| 7,885,878 B2 | 2/2011 | Newbrough |
| 8,511,547 B2 * | 8/2013 | Rans ...................... G06Q 20/40 |
| | | 235/492 |
| 8,840,030 B2 * | 9/2014 | Kelley ............... G06K 19/0723 |
| | | 235/492 |
| 9,348,929 B2 * | 5/2016 | Eberlein ............. G06F 16/9566 |
| 9,805,362 B2 * | 10/2017 | Kobylkin .............. G06Q 20/354 |
| 10,074,231 B2 * | 9/2018 | Miranda .............. G06Q 20/352 |
| 10,963,864 B2 | 3/2021 | Ball et al. |
| 2007/0189581 A1 | 8/2007 | Nordentoft et al. |
| 2008/0243534 A1 | 10/2008 | Mutlu |
| 2010/0235249 A1 | 9/2010 | Smith et al. |
| 2014/0046744 A1 | 2/2014 | Hagey |
| 2015/0058216 A1 | 2/2015 | Luciani |
| 2016/0086184 A1 | 3/2016 | Carpenter et al. |

* cited by examiner

SYSTEM AND METHOD FOR RAPID ACTIVATION AND PROVISIONING OF AN ELECTRONIC PAYMENT DEVICE

CROSS REFERENCE TO RELATED APPLICATION

This application is a continuation of U.S. patent application Ser. No. 16/962,569, filed Jan. 17, 2019, which is the United States national phase of PCT/US2019/013973, filed Jan. 17, 2019, and claims priority to U.S. Provisional Patent Application No. 62/618,314, filed Jan. 17, 2018, entitled "Rapid Activation and Provisioning," the disclosures of which are hereby incorporated by reference in their entirety.

BACKGROUND

Field

Disclosed embodiments relate generally to a system and method for activating a portable electronic payment device and, in some non-limiting embodiments or aspects, to a system and method for activating an electronic payment device with a mobile device.

Technical Considerations

Activation of electronic payment devices, such as credit cards, chip cards, and the like, has required the cardholder to call an issuer at a phone number provided on a sticker applied to the front of the card. Then, using their telephone, the cardholder typically had to enter identifying information, such as a social security number, to allow the card issuer to verify the cardholder's identity and activate the electronic payment device.

These activities are time-consuming and are susceptible to fraud, as a fraudster can activate a cardholder's device if a single piece of identifying information is known.

Accordingly, there is a need in the art for an improved method and system for activating an electronic payment device in a rapid manner to encourage provisioning and activation of such devices and to reduce instances of fraud. Such a solution is possible when a mobile device associated with the cardholder is utilized as a tool to activate the electronic payment device.

SUMMARY

According to some non-limiting embodiments or aspects, provided is a method of activating an electronic payment device, including the steps of generating, with at least one processor, activation data corresponding to a non-activated electronic payment device issued to a user; storing, on an activation element associated with the electronic payment device, a unique identifier corresponding to the electronic payment device; receiving, with at least one processor, an activation request from a mobile device in response to the user scanning the activation element with the mobile device, the activation request comprising identification data associated with the user and the unique identifier; determining, with at least one processor, that the activation data matches the identification data; and in response to determining that the activation data matches the identification data, activating the electronic payment device.

According to some non-limiting embodiments or aspects, provided is a system for activating an electronic payment device, including at least one processor programmed and/or configured to: generate activation data corresponding to a non-activated electronic payment device issued to a user; store, on an activation element associated with the electronic payment device, a unique identifier corresponding to the electronic payment device; receive an activation request from a mobile device in response to the user scanning the activation element with the mobile device, the activation request comprising identification data associated with the user and the unique identifier; determine that the activation data matches the identification data; and in response to determining that the activation data matches the identification data, activate the electronic payment device.

According to some non-limiting embodiments or aspects, provided is a system for activating an electronic payment device, including: an activation element configured to be arranged on an electronic payment device; and at least one processor programmed and/or configured to: generate activation data corresponding to a non-activated electronic payment device issued to a user; store, on the activation element associated with the electronic payment device, a unique identifier corresponding to the electronic payment device; receive an activation request from a mobile device in response to the user scanning the activation element with the mobile device, the activation request comprising identification data associated with the user and the unique identifier; determine that the activation data matches the identification data; and in response to determining that the activation data matches the identification data, activate the electronic payment device.

Further non-limiting embodiments or aspects are set forth in the following numbered clauses:

Clause 1: A method of activating an electronic payment device, comprising: generating, with at least one processor, activation data corresponding to a non-activated electronic payment device issued to a user; storing, on an activation element associated with the electronic payment device, a unique identifier corresponding to the electronic payment device; receiving, with at least one processor, an activation request from a mobile device in response to the user scanning the activation element with the mobile device, the activation request comprising identification data associated with the user and the unique identifier; determining, with at least one processor, that the activation data matches the identification data; and in response to determining that the activation data matches the identification data, activating the electronic payment device.

Clause 2: The method of clause 1, wherein the activation element comprises a machine-readable indicia.

Clause 3: The method of clauses 1 or 2, wherein the activation element comprises a near field communication device.

Clause 4: The method of any of clauses 1-3, wherein the activation data comprises one or more of an email address, a username, an Internet Protocol (IP) address, a browser or application cookie ID, and user location data.

Clause 5: The method of any of clauses 1-4, wherein the user location data comprises an address associated with the user, and wherein the step of determining comprises determining that a location of the user when the activation request is received is within a predetermined radius of the address.

Clause 6: The method of any of clauses 1-5, wherein the identification data comprises one or more of an email address, a username, an Internet Protocol (IP) address, a browser or application cookie ID, and user location data.

Clause 7: The method of any of clauses 1-6, wherein the user location data comprises an address associated with the user, and wherein the step of determining comprises determining that a location of the user when the activation request is received is within a predetermined radius of the address.

Clause 8: The method of any of clauses 1-7, further comprising the step of shipping, to the user, the electronic payment device comprising the activation element thereon, wherein the identification data is information that is not present in or on the electronic payment device or packaging associated with the electronic payment device.

Clause 9: The method of any of clauses 1-8, further comprising generating a random value or hashing one or both of the activation data and the identification data.

Clause 10: The method of any of clauses 1-9, wherein the step of determining comprises matching the activation data to the hashed identification data, or matching the identification data to the hashed activation data.

Clause 11: The method of any of clauses 1-10, wherein the activation data and the identification data comprise a browser or application cookie, and wherein the step of determining comprises matching the browser or application cookie of the activation data with the browser or application cookie of the identification data and, in response to determining that the browser or application cookie of the activation data matches the browser or application cookie of the identification data, activating the electronic payment device.

Clause 12: The method of any of clauses 1-11, wherein the activation element comprises a device link comprising a uniform resource locator, and wherein the step of receiving the activation request comprises receiving the identification data through the device link.

Clause 13: The method of any of clauses 1-12, wherein the activation data is stored in a database comprising activation data for one or more inactive electronic payment devices, and wherein the step of determining comprises comparing the identification data to the activation data for the one or more inactive electronic payment devices.

Clause 14: The method of any of clauses 1-13, wherein the determining step further comprises: generating a risk score based on the comparison; and activating the electronic payment device if the risk score meets a predetermined threshold.

Clause 15: The method of any of clauses 1-14, further comprising a step of arranging the activation element on the electronic payment device.

Clause 16: A system for activating an electronic payment device, comprising at least one processor programmed and/or configured to: generate activation data corresponding to a non-activated electronic payment device issued to a user; store, on an activation element associated with the electronic payment device, a unique identifier corresponding to the electronic payment device; receive an activation request from a mobile device in response to the user scanning the activation element with the mobile device, the activation request comprising identification data associated with the user and the unique identifier; determine that the activation data matches the identification data; and in response to determining that the activation data matches the identification data, activate the electronic payment device.

Clause 17: The system of clause 16, wherein the system further comprises the activation element, and wherein the activation element comprises a machine-readable indicia.

Clause 18: The system of clauses 16 or 17, wherein the system further comprises the activation element, and wherein the activation element comprises a near field communication device.

Clause 19: The system of any of clauses 16-18, wherein the activation data comprises one or more of an email address, a username, an Internet Protocol (IP) address, a browser or application cookie ID, and user location data.

Clause 20: The system of any of clauses 16-19, wherein the user location data comprises an address associated with the user, and wherein the processor is further programmed and/or configured to determine that a location of the user when the activation request is received is within a predetermined radius of the address.

Clause 21: The system of any of clauses 16-20, wherein the identification data comprises one or more of an email address, a username, an Internet Protocol (IP) address, a browser or application cookie ID, and user location data.

Clause 22: The system of any of clauses 16-21, wherein the user location data comprises an address associated with the user, and wherein the processor is further programmed and/or configured to determine that a location of the user when the activation request is received is within a predetermined radius of the address.

Clause 23: The system of any of clauses 16-22, wherein the processor is further programmed and/or configured to: generate a random value or hash one or both of the activation data and the identification data.

Clause 24: The system of any of clauses 16-23, wherein the processor is further programmed and/or configured to match the activation data to the hashed identification data, or match the identification data to the hashed activation data.

Clause 25: The system of any of clauses 16-24, wherein the activation data and the identification data comprise a browser or application cookie, and wherein the processor is further programmed and/or configured to: match the browser or application cookie of the activation data with the browser or application cookie of the identification data; and in response to determining that the browser or application cookie of the activation data matches the browser or application cookie of the identification data, activate the electronic payment device.

Clause 26: The system of any of clauses 16-25, wherein the activation element comprises a device link comprising a uniform resource locator, and wherein the processor is further programmed or configured to receive the identification data through the device link.

Clause 27: The system of any of clauses 16-26, wherein the processor is further programmed and/or configured to: store activation data in a database comprising activation data for one or more inactive electronic payment devices; and compare the identification data to the activation data for the one or more inactive electronic payment devices.

Clause 28: The system of any of clauses 16-27, wherein the processor is further programmed and/or configured to: generate a risk score based on the comparison; and activate the electronic payment device if the risk score meets a predetermined threshold.

Clause 29: A system for activating an electronic payment device, comprising: an activation element configured to be arranged on an electronic payment device; and at least one processor programmed and/or configured to: generate activation data corresponding to a non-activated electronic payment device issued to a user; store, on the activation element associated with the electronic payment device, a unique identifier corresponding to the electronic payment device; receive an activation request from a mobile device in response to the user scanning the activation element with the mobile device, the activation request comprising identification data associated with the user and the unique identifier; determine that the activation data matches the identification data; and in response to determining that the activation data matches the identification data, activate the electronic payment device.

Clause 30: The system of clause 29, wherein the activation element comprises a machine-readable indicia.

Clause 31: The system of clauses 29 or 30, wherein the activation element comprises a near field communication device.

These and other features and characteristics of the present embodiments and aspects, as well as the methods of operation and functions of the related elements of structures and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the disclosure. As used in the specification and the claims, the singular form of "a," "an," and "the" includes plural referents unless the context clearly dictates otherwise.

BRIEF DESCRIPTION OF THE DRAWINGS

Additional advantages and details of the disclosure are explained in greater detail below with reference to the exemplary embodiments and aspects that are illustrated in the accompanying figures, in which.

DESCRIPTION

Figure 1:
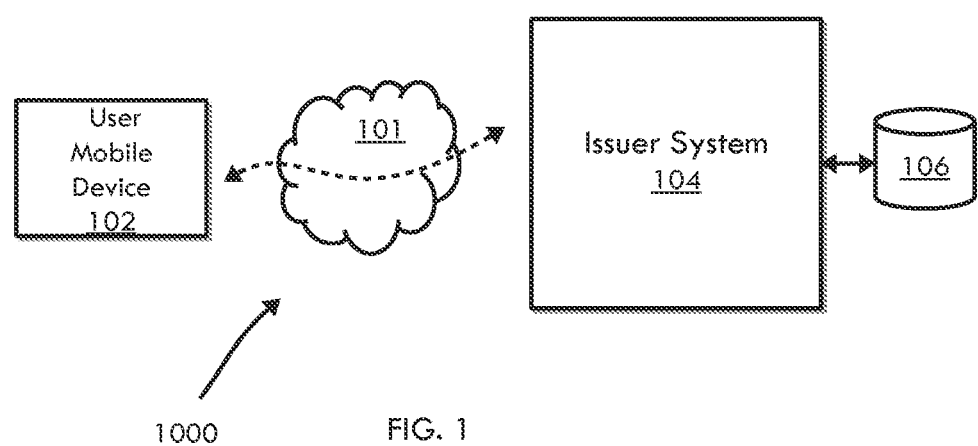
FIG. 1 is a schematic diagram of some non-limiting embodiments or aspects of a method and system for activating an electronic payment device.

For purposes of the description hereinafter, the terms "upper," "lower," "right," "left," "vertical," "horizontal," "top," "bottom," "lateral," "longitudinal," and derivatives thereof shall relate to the various embodiments and aspects as oriented in the drawing figures. However, it is to be understood that the embodiments and aspects may assume various alternative variations and step sequences, except where expressly specified to the contrary. It is also to be understood that the specific devices and the method illustrated in the attached drawings, and described in the following specification, are simply exemplary embodiments or aspects. Hence, specific dimensions and other physical characteristics related to the embodiments disclosed herein are not to be considered as limiting. Also, it should be understood that any numerical range recited herein is intended to include all sub-ranges subsumed therein. For example, a range of "1 to 10" is intended to include all sub-ranges between (and including) the recited minimum value of 1 and the recited maximum value of 10, that is, having a minimum value equal to or greater than 1 and a maximum value of equal to or less than 10.

As used herein, the terms "communication" and "communicate" refer to the receipt or transfer of one or more signals, messages, commands, or other type of data. For one unit (e.g., any device, system, or component thereof) to be in communication with another unit means that the one unit is able to directly or indirectly receive data from and/or transmit data to the other unit. This may refer to a direct or indirect connection that is wired and/or wireless in nature. Additionally, two units may be in communication with each other even though the data transmitted may be modified, processed, relayed, and/or routed between the first and second unit. For example, a first unit may be in communication with a second unit even though the first unit passively receives data and does not actively transmit data to the second unit. As another example, a first unit may be in communication with a second unit if an intermediary unit processes data from one unit and transmits processed data to the second unit. It will be appreciated that numerous other arrangements are possible.

As used herein, the term "issuer" may refer to one or more entities, such as a bank, that provides accounts to customers for conducting payment transactions, such as initiating credit and/or debit payments. For example, an issuer institution may provide an account identifier, such as a primary account number (PAN), to a customer or that uniquely identifies one or more accounts associated with that customer. The account identifier may be embodied on a physical financial instrument, such as a payment card, and/or may be electronic and used for electronic payments. As used herein, the term "account identifier" may include one or more PANs, tokens, or other identifiers associated with a customer account. An account identifier may be directly or indirectly associated with an issuer institution, such that an account identifier may be a token that maps to a PAN or other type of account identifier. The term "token" may refer to an identifier that is used as a substitute or replacement identifier for an original account identifier, such as a PAN. Account identifiers may be alphanumeric or any combination of characters and/or symbols. Tokens may be associated with a PAN or other original account identifiers in one or more databases such that they can be used to conduct a transaction without directly using the original account identifier. In some examples, an original account identifier, such as a PAN, may be associated with a plurality of tokens for different individuals or purposes. An issuer institution may be associated with a bank identification number (BIN) or other unique identifier that uniquely identifies it among other issuer institutions. The terms "issuer institution," "issuer bank," and "issuer system" may also refer to one or more computer systems operated by or on behalf of an issuer institution, such as a server computer executing one or more software applications. For example, an issuer system may include one or more servers for activating an electronic payment device.

As used herein, the term "electronic payment device" may refer to a portable (e.g., physical) payment card, a gift card, a smartcard, a smart media, a payroll card, a healthcare card, a wrist band, a machine-readable medium containing account information, a keychain device, a supermarket discount card, a cellular phone, a mobile device, a personal digital assistant (PDA), a pager, a security card, a computer, an access card, a wireless terminal, or a transponder. The electronic payment device may include volatile or non-volatile memory to store information, such as the account number or a name of the account holder. The term "electronic payment device" may also refer to any unique identifier, physical or digital, associated with a financial transaction account that can be used to complete a transaction between a user of the electronic payment device and another party, such as a merchant. For example, an electronic payment device may be a financial transaction account number and confirmation code that may be entered into an online store payment interface. It will be appreciated that many other configurations and embodiments are possible.

As used herein, the term "mobile device" may refer to one or more portable electronic devices that are configured to communicate with one or more networks. As an example, a mobile device may include a cellular phone (e.g., a smartphone or standard cellular phone), a portable computer, a wearable device (e.g., watches, glasses, lenses, clothing, and/or the like), a PDA, and/or other like devices.

As used herein, the term "activation element" may refer to any device that is capable of being configured or arranged on an electronic payment device and that can interact with a mobile device to allow a user to activate the electronic payment device. As an example, and without limitation, activation elements may include near-field communication (NFC) devices, radio frequency identification (RFID) devices (e.g., transponders), two- or three-dimensional barcodes (e.g., QR codes), and/or any other data carrier medium. In some non-limiting embodiments, an activation element may also include a chip embedded into a physical card that may serve multiple purposes.

As used herein, the terms "electronic wallet" and "electronic wallet application" refer to one or more electronic devices and/or software applications configured to initiate and/or conduct payment transactions. For example, an electronic wallet may include a mobile device executing an electronic wallet application and may further include server-side software and/or databases for maintaining and providing transaction data to the mobile device. An "electronic wallet provider" may include an entity that provides and/or maintains an electronic wallet for a customer, such as Google Pay®, Android Pay®, Apple Pay®, Samsung Pay®, and/or other like electronic payment systems. In some non-limiting examples, an issuer bank may be an electronic wallet provider.

Non-limiting embodiments or aspects of the disclosure provide for a system and method for provisioning and activating a user's electronic payment device through a mobile device associated with a user. By activating the electronic payment device through the associated mobile device, the activation process is more rapid and more secure. Non-limiting embodiments provide for an improved electronic payment device having an activation element that is not provided on typical electronic payment devices. Non-limiting embodiments also include an improved system architecture for activating and provisioning electronic payment devices with improved security and efficiency. This architecture provides greater functionality for electronic payment devices and increased security from fraudsters.

Provided herein are systems and methods for provisioning and activating an electronic payment device. FIG. 1 illustrates a system (1000) to provision and activate an electronic payment device according to some non-limiting embodiments or aspects. In FIG. 1, the system (1000) includes a mobile device (102) associated with a user, and an issuer system (104). The components of the system (1000) may communicate through a network (101), such as the Internet and/or one or more private networks. In some non-limiting embodiments or aspects, the issuer system (104) can communicate with a database (106). In some non-limiting embodiments or aspects, the system (1000) further includes an activation element. In some non-limiting embodiments or aspects, the activation element is attached to, embedded within, or arranged on at least a portion of the electronic payment device. The components of the system (1000) shown in FIG. 1 may be utilized to carry out the methods shown in FIG. 2 and FIG. 4.

Figure 2:
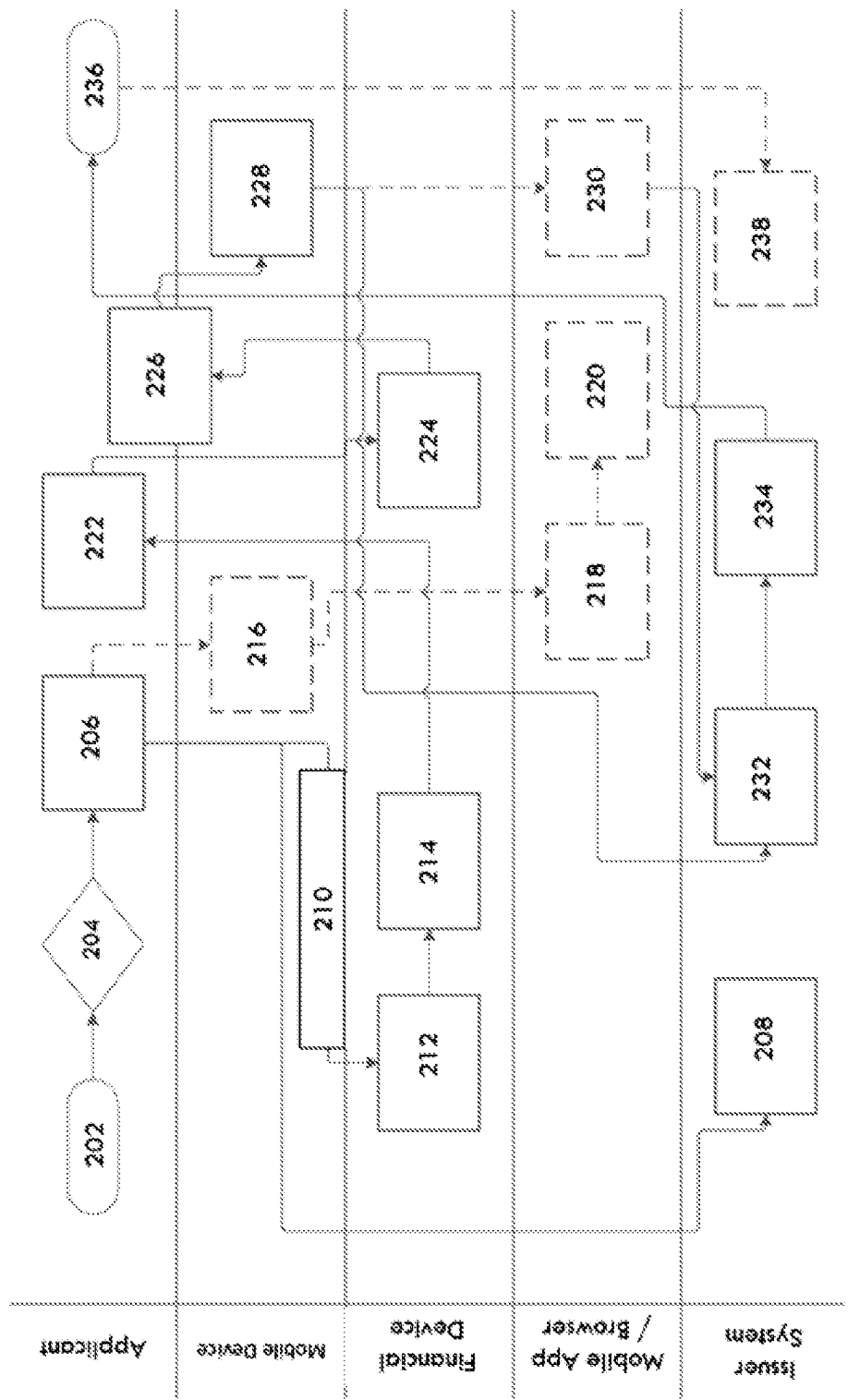
FIG. 2 is a process diagram of some non-limiting embodiments or aspects of a method and system for activating an electronic payment device.

With reference to FIG. 2, illustrated is a method of provisioning and activating an electronic payment device. A user first applies (step 202) for an electronic payment device from an issuer, which can proceed according to any suitable application/authorization processes (204). In some non-limiting embodiments or aspects, the application process occurs through an issuer's website or an issuer's mobile application.

As part of the application process, the user provides certain application data to the issuer system. In some non-limiting embodiments or aspects, the application data includes one or more of a username, password, email address, Internet Protocol (IP) address, a browser cookie identifier (ID), a mobile application cookie ID, personal account number (PAN), cvv2 number, electronic payment device expiration date, time/date data, and/or location data for the user. In some non-limiting embodiments or aspects, the location data includes an address associated with the user. Such address data may include, but is not limited to, a street address, a zip code, an area code, or geographic coordinates. As will be discussed in greater detail below, the activation data is stored by the issuer system as an activation object and, during the activation process, is compared to identification data provided by the user in an activation request. In some non-limiting embodiments or aspects, the activation data is data that would not be known or easily accessible to a fraudster who obtains an inactive electronic payment device.

With continued reference to FIG. 2, upon approval, the activation data, which is associated with an inactive electronic payment device, is stored by the issuer system (step 208). In some non-limiting embodiments or aspects, the activation data is stored in a database with activation data associated with other inactive electronic payment devices. In some non-limiting embodiments or aspects, the issuer system, which has received the activation data, combines the activation data and generates a unique identifier (ID) by hashing the respective values together using one or more one-way hash functions, such as, but not limited to, a Secure Hash Algorithm (SHA). For example and without limitation, the respective values of the activation data may be combined using an exclusive or (XOR) operation or other digital logic gate. In some non-limiting embodiments or aspects, the activation data may be combined using any other type of algorithm, such as a reversible encryption algorithm. Moreover, one or more additional data processing operations, such as, but not limited to, additional cryptographic functions, may be applied to the activation data to generate a unique ID. A random number may also be used for a unique ID. The unique ID and/or activation data may then be stored by the issuer system, for example in a database with other unique IDs associated with other inactive electronic payment devices.

In some non-limiting embodiments or aspects, upon approval, the issuer system can prompt the user, through an emailed link, text message, or the like, to download (step 216) a mobile application associated with the issuer. As part of the installation (step 218) process, the mobile application may ask the user to log in to the application (step 220), for example using credentials provided with the activation data and/or during the application process. In some non-limiting embodiments or aspects, the user has previously downloaded the mobile application associated with the issuer and has applied for the electronic payment device through the mobile application. It will be appreciated that the user may also access a mobile website associated with the issuer through a browser application.

With continuing reference to FIG. 2, after approval, the issuer generates (step 212) an electronic payment device and an activation element associated with the electronic payment device. The activation element may include activation element data. In some non-limiting embodiments or aspects, the activation element data includes a link. The link (e.g., a deep link) includes a uniform resource locator (URL) that causes the mobile device to open a web browser and to navigate to a predetermined web page or open a mobile application on the user's mobile device. In some non-limiting embodiments or aspects, the URL is created by the issuer system based at least in part on the activation data, and, in some non-limiting embodiments or aspects, based on the unique ID generated based on the activation data.

With continued reference to FIG. 2, the issuer associates the activation element with the electronic payment device, for example and without limitation, by affixing a sticker including the activation element to the electronic payment device. The issuer then ships the electronic payment device to the user (step 214). In some non-limiting embodiments or aspects, the electronic payment device is shipped to the user in packaging that is resistant to technology that could be used to access/utilize the activation element. For example, and without limitation, the packaging may obscure any QR code or be shielded to prevent a NFC or RFID element from being detected by a device.

To activate the electronic payment device once it is received (step 222) and the packaging is opened (step 224), the user utilizes his or her mobile device to interact with the activation element (step 226). For example, the user may actively scan the activation element (e.g., a QR code) or place their mobile device in close proximity to the activation element (e.g., NFC or RFID). In other examples, the mobile device may receive data from the activation element while the screen is off or locked using background functionality available from devices utilizing operating systems such as, for example, Android and iOS. As described previously, In some non-limiting embodiments or aspects, the activation element includes activation element data that may include a link, such as a deep link. By interacting with the activation element the mobile device is instructed to open a web browser (step 228) and navigate to a webpage based on a URL included in the activation element data.

In some non-limiting embodiments or aspects, the web page or the mobile application will prompt the user to input identification data to proceed with the activation process. In some non-limiting embodiments or aspects, the identification data includes one or more of a username, password, email address, IP address, a browser cookie ID, a mobile application cookie ID, PAN, cvv2 number, electronic payment device expiration date, time/date data, and/or location data for the user. In some non-limiting embodiments or aspects, the location data includes an address associated with the user. Such address data may include, but is not limited to, a street address, a zip code, an area code, or geographic coordinates. In some non-limiting embodiments or aspects, the identification data is data that is not included in or on any shipping material or packaging in which the electronic payment device was shipped to the user. In this way, a fraudster is prevented from activating an electronic payment device merely by having access to the electronic payment device and limited information about the user, such as a social security number.

With continued reference to FIG. 2, in some non-limiting embodiments or aspects, the issuer system, which has received the identification data, combines the identification data and generates a unique ID by hashing the respective values together using one or more one-way hash functions, such as, but not limited to a SHA. For example and without limitation, the respective values of the identification data may be combined using an exclusive or (XOR) operation or other digital logic gate. In some non-limiting embodiments or aspects, the identification data may be combined using any other type of algorithm, such as a reversible encryption algorithm. Moreover, one or more additional data processing operations, such as but not limited to additional cryptographic functions, may be applied to the activation data to generate a unique ID. A random number may also be useful for a unique ID.

In some non-limiting embodiments or aspects, the user will be prompted to log in to the mobile application associated with the issuer, and the act of logging in to the mobile application provides the identification data. In some non-limiting embodiments or aspects, the user has previously logged in to the mobile application associated with the issuer, and the mobile application provides the identification data automatically, without requiring further input from the user.

With continued reference to FIG. 2, regardless of whether the user provides identification data through the web page, the mobile application, or in some other way, or the mobile application automatically provides the identification data, the issuer system compares or matches (step 232) the identification data to the application data that was previously provided and stored, optionally in a database with other inactive electronic payment devices, during the application/approval process.

In some non-limiting embodiments or aspects, the issuer system compares the identification data to the activation data for inactive electronic payment devices stored in a database. In some non-limiting embodiments or aspects, the issuer system compares the identification data to the unique ID based on the activation data. In some non-limiting embodiments or aspects, the issuer system compares the unique ID based on the identification data to the application data. In some non-limiting embodiments or aspects, the issuer system compares the unique ID based on the identification data to the unique ID based on the application data.

In some non-limiting embodiments or aspects, the activation data and identification data include at least location data. In some non-limiting embodiments or aspects, the issuer system compares the identification location data to the activation location data to determine whether the electronic payment device is to be activated. In some non-limiting embodiments or aspects, comparing the identification location data to the activation location data includes determining whether the mobile device is within a predetermined radius of a location included in the activation data, such as, for example and without limitation, the user's home, place of employment, or other safe location identified by the user.

In some non-limiting embodiments or aspects, the activation data and identification data include a browser or application cookie. In some non-limiting embodiments or aspects, the issuer system compares the browser or application cookie from the time of activation (the identification cookie) to the browser or application cookie from the time of application (activation cookie) to determine whether the electronic payment device is to be activated. In some non-limiting embodiments or aspects, a device ID may be compared between the time of application and the time of activation. In this way the electronic payment device can only be activated using a mobile device that the user used to submit the original application to the issuer.

In some non-limiting embodiments or aspects, the issuer system determines whether the identification data matches the activation data within a predetermined probability (e.g., a risk score). In some non-limiting embodiments, the identification data is compared to the activation data, and, based on the comparison, a probability score is generated that represents a probability that the identification data belongs to the user, and thus that the electronic payment device should be activated. In some non-limiting embodiments, the generated risk score may be compared to a predetermined threshold and if the risk score exceeds the predetermined threshold, the issuer will activate the electronic payment device. Thresholds can be set at, for example and without limitation, 99%, 95%, 90%, 85%, 80%, 75%, 70%, 65%, 60%, 55%, or 50%. In some non-limiting embodiments, the predetermined threshold may be set by the issuer. In some non-limiting embodiments, the predetermined threshold may be adjusted based on the type of electronic payment device or the type of activation and identification data being utilized in the comparison.

With further reference to FIG. 2, if the issuer system determines that the identification data matches the activation data, the electronic payment device is activated (step 234). After the activation process has concluded (step 236), the electronic payment device is provisioned and ready for use (step 238). In some non-limiting embodiments or aspects, when the electronic payment device is provisioned, a message, for example and without limitation an email, a text message, or the like, may be sent to the user, for example to the user's mobile device, offering to add the activated electronic payment device to an electronic wallet.

Figure 3:
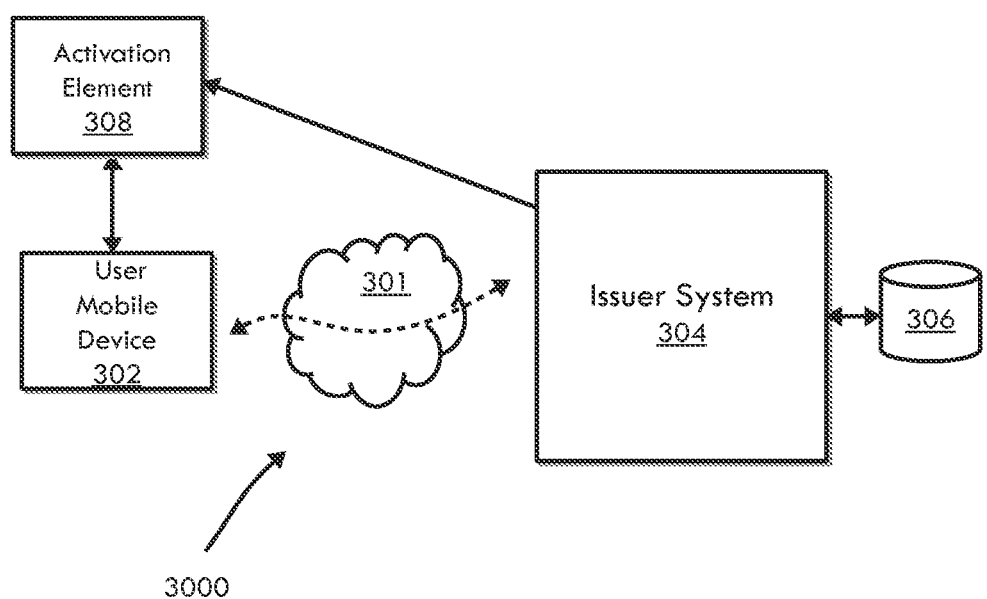
FIG. 3 is a schematic diagram of some non-limiting embodiments or aspects of a method and system for activating an electronic payment device.

With reference to FIG. 3, illustrated are non-limiting embodiments or aspects of a system (3000) for activating an electronic payment device. In FIG. 3, the system (3000) includes a mobile device (302) associated with a user, and an issuer system (304). The components of the system may communicate through a network (301). In some non-limiting embodiments or aspects, the issuer system can communicate with a database (306). In some non-limiting embodiments or aspects, the system (3000) further includes an activation element (308). In some non-limiting embodiments or aspects, the activation element (308) is attached to, embedded within, or arranged on at least a portion of the electronic payment device. The components of the system shown in FIG. 3 may be utilized to carry out the method shown in FIG. 2 and FIG. 4.

As described previously, the issuer associates the activation element (308) with the electronic payment device, for example and without limitation, by affixing a sticker including the activation element to electronic payment device. The issuer then ships the electronic payment device to the user. In some non-limiting embodiments or aspects, the electronic payment device is shipped to the user in packaging that is resistant to technology that could be used to access/utilize the activation element (308). For example, and without limitation, the packaging may obscure any QR code or be shielded to prevent a NFC or RFID element from being detected by a device.

Figure 4:
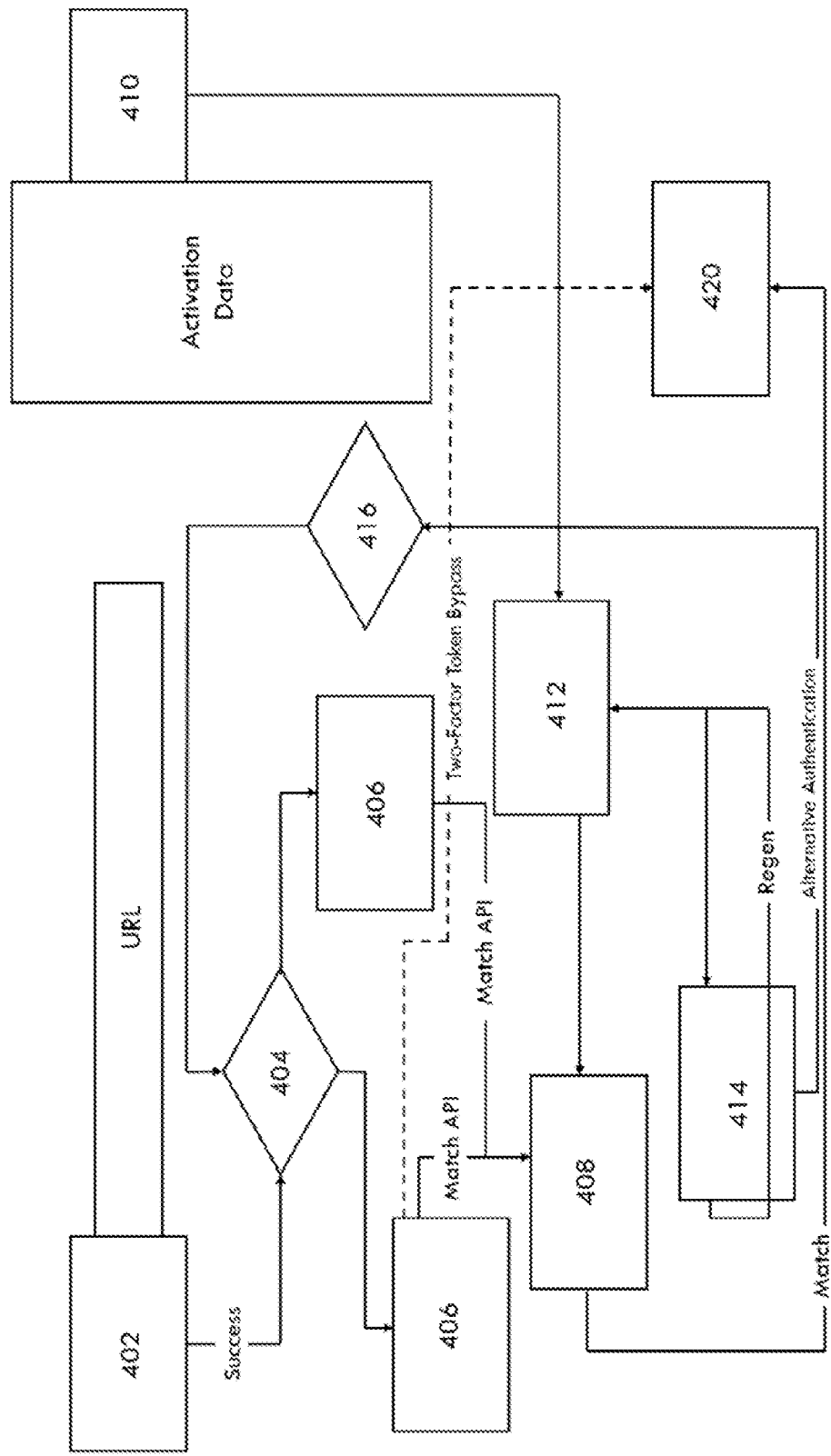
FIG. 4 is a process diagram of some non-limiting embodiments or aspects of a method and system for activating an electronic payment device.

With reference to FIG. 4, illustrated are non-limiting embodiments or aspects of a method of activating an electronic payment device. As shown, the activation element includes activation element data including a URL directing (step 402) a web browser or application on the user's mobile device to a predetermined web page (step 404). In some non-limiting embodiments or aspects, the URL includes the unique ID. The issuer system receives, through the web browser or mobile application, a request (step 406) to activate the electronic payment device. As described above, the issuer system may, in some non-limiting embodiments or aspects, generate, with a hash generator (step 412), a hash of the activation data (step 410) previously provided by the user during the application process. In the illustrated non-limiting embodiment, the issuer system determines (step 408) whether the identification data, received through a web browser or mobile application, matches the unique ID. If the data matches the card is activated by the issuer (step 420).

As also shown in FIG. 4, in some non-limiting embodiments or aspects, as an alternative, or in addition, to comparison of identification data to application data, the issuer may utilize a multi-factor authentication (step 416) in the activation process. In some non-limiting embodiments or aspects, if the identification data does not match the unique ID, the issuer may send a notification to the mobile device requesting multi-factor authentication. This multi-factor authentication can supplement, the mobile activation described herein, providing another layer of security and protection from fraudsters, while continuing to enable rapid activation and provisioning of the electronic payment device.

Although the various embodiments and aspects have been described in detail for the purpose of illustration based on what is currently considered to be the most practical and preferred embodiments, it is to be understood that such detail is solely for that purpose and that the disclosure is not limited to the disclosed embodiments, but, on the contrary, is intended to cover modifications and equivalent arrangements that are within the spirit and scope of the appended claims. For example, it is to be understood that the present embodiments and aspects contemplate that, to the extent possible, one or more features of any embodiment or aspect can be combined with one or more features of any other embodiment or aspect.

We claim:

1. A method of activating an electronic payment device, comprising:
   receiving, with at least one processor and in response to scanning, with a mobile device associated with a user, an activation element arranged on a non-activated electronic payment device, a unique identifier associated with the electronic payment device and a deep link comprising a uniform resource locator (URL) associated with a mobile application;
   in response to receiving the URL, opening, with at least one processor and on the mobile device, the mobile application;
   automatically, and without user input, generating, with at least one processor and through the mobile application, an activation request, the activation request comprising the unique identifier and identification data supplied by the mobile application; and
   transmitting, with at least one processor, the activation request to an issuer system associated with the electronic payment device.

2. The method of claim 1, further comprising, receiving, with at least one processor, an alert that the electronic payment device has been activated.

3. The method of claim 2, wherein the alert comprises a text message.

4. The method of claim 2, wherein the alert comprises an email.

5. The method of claim 1, further comprising receiving, with at least one processor, an alert that the electronic payment device has not been activated.

6. The method of claim 5, wherein the alert comprises a request for multifactor authentication.

7. The method of claim 1, wherein the activation element comprises a machine-readable indicia or a near-field communication device.

8. The method of claim 1, wherein the identification data comprises one or more of an email address, a username, an Internet Protocol (IP) address, a browser or mobile application cookie ID, and user location data, optionally wherein when the user location data comprises an address associated with the user.

9. The method of claim 1, wherein the URL is based at least in part on activation data, the activation data comprising one or more of an email address, a username, an Internet Protocol (IP) address, and user location data, optionally wherein when the user location data comprises an address associated with the user.

10. The method of claim 9, wherein the URL is further based at least in part on the unique identifier.

11. A system for activating an electronic payment device, comprising at least one processor programmed and/or configured to:
receive, in response to scanning, with a mobile device associated with a user, an activation element arranged on a non-activated electronic payment device, a unique identifier associated with the electronic payment device and a deep link comprising a uniform resource locator (URL) associated with a mobile application;
in response to receiving the URL, open the mobile application on the mobile device;
automatically, and without user input, generate, through the mobile application, an activation request, the activation request comprising the unique identifier and identification data supplied by the mobile application;
transmit the activation request to an issuer system associated with the electronic payment device.

12. The system of claim 11, wherein the at least one processor is further programmed and/or configured to receive an alert that the electronic payment device has been activated.

13. The system of claim 12, wherein the alert comprises a text message.

14. The system of claim 12, wherein the alert comprises an email.

15. The system of claim 11, wherein the at least one processor is further programmed and/or configured to receive an alert that the electronic payment device has not been activated.

16. The system of claim 15, wherein the alert comprises a request for multifactor authentication.

17. The system of claim 11, wherein the activation element comprises a machine-readable indicia or a near-field communication device.

18. The system of claim 11, wherein the identification data comprises one or more of an email address, a username, an Internet Protocol (IP) address, a browser or mobile application cookie ID, and user location data, optionally wherein when the user location data comprises an address associated with the user.

19. The system of claim 11, wherein the URL is based at least in part on activation data, the activation data comprising one or more of an email address, a username, an Internet Protocol (IP) address, and user location data, optionally wherein when the user location data comprises an address associated with the user.

20. The system of claim 19, wherein the URL is further based at least in part on the unique identifier.

* * * * *